United States Patent
Jung et al.

(10) Patent No.: US 11,244,461 B2
(45) Date of Patent: Feb. 8, 2022

(54) APPARATUS AND METHOD FOR DETECTING OIL SPILL BY USING SATELLITE IMAGE

(71) Applicant: University of Seoul Industry Cooperation Foundation, Seoul (KR)

(72) Inventors: Hyung Sup Jung, Seoul (KR); Sung Hwan Park, Seoul (KR); Sung Ho Chae, Seoul (KR)

(73) Assignee: Univ. of Seoul Industry Cooperation Foundation, Seoul (KR)

( * ) Notice: Subject to any disclaimer, the term of this patent is extended or adjusted under 35 U.S.C. 154(b) by 713 days.

(21) Appl. No.: 16/223,742

(22) Filed: Dec. 18, 2018

(65) Prior Publication Data

US 2019/0122369 A1 Apr. 25, 2019

Related U.S. Application Data

(63) Continuation of application No. PCT/KR2017/006506, filed on Jun. 21, 2017.

(30) Foreign Application Priority Data

Jun. 30, 2016 (KR) .................. 10-2016-0082327

(51) Int. Cl.
  *G06T 7/143* (2017.01)
  *G06T 17/05* (2011.01)
  (Continued)

(52) U.S. Cl.
  CPC .............. *G06T 7/143* (2017.01); *G01S 19/14* (2013.01); *G01V 8/00* (2013.01); *G06T 7/90* (2017.01); *G06T 17/05* (2013.01)

(58) Field of Classification Search
  CPC . G06T 7/143; G06T 7/90; G06T 17/05; G01S 19/14; G01V 8/00
  (Continued)

(56) References Cited

U.S. PATENT DOCUMENTS

| 8,362,429 B2 * | 1/2013 | Andrews .................. G01V 8/02 250/339.14 |
| 10,943,357 B2 * | 3/2021 | Badawy ........... G08B 13/19604 |
| 2018/0239948 A1 * | 8/2018 | Rutschman ............... G06T 7/20 |

FOREIGN PATENT DOCUMENTS

| JP | 2012-242948 A | 12/2012 |
| KR | 10-1039665 B1 | 6/2011 |

(Continued)

OTHER PUBLICATIONS

Choe, E. et al., "Calibration/validation of water quality model using remote sensing techniques", Nakdong River Environment Research Center, National Institute of Environmental Research, 45 pages, English Abstract (2011).

(Continued)

*Primary Examiner* — Aditya S Bhat
(74) *Attorney, Agent, or Firm* — United One Law Group LLC; Kongsik Kim; Jhongwoo Peck

(57) ABSTRACT

The present invention relates to an apparatus and method for detecting an oil spill by using a satellite image, an apparatus for detecting an oil spill by using a satellite image, the apparatus including: a satellite image reception unit configured to receive a satellite image of a predicted oil spill area; a satellite image correction unit configured to correct the satellite image by compensating for the influences of the atmosphere and waves; a spectral angle mapper image generation unit configured to generate a spectral angle mapper image; a spectral vector distance image generation unit configured to generate a spectral vector distance image; and an oil spill area detection unit configured to derive the range of the oil spill area by combining the spectral angle mapper image and the spectral vector distance image together.

9 Claims, 8 Drawing Sheets

(51) Int. Cl.
  *G06T 7/90* (2017.01)
  *G01S 19/14* (2010.01)
  *G01V 8/00* (2006.01)

(58) Field of Classification Search
  USPC .......................................................... 702/2
  See application file for complete search history.

(56) References Cited

FOREIGN PATENT DOCUMENTS

KR   10-2012-0036487 A   4/2012
KR         101400924 B1   6/2014

OTHER PUBLICATIONS

Fingas, Merv, MSc, PhD., "Oil Spill Remote Sensing", ISCO Newsletter, 22 pages (2012).

* cited by examiner

APPARATUS AND METHOD FOR DETECTING OIL SPILL BY USING SATELLITE IMAGE

CROSS-REFERENCE TO RELATED APPLICATION

This application is a continuation of PCT/KR2017/006506 filed on Jun. 21, 2017, which claims priority to Korean Patent Application No. 10-2016-0082327 filed on Jun. 30, 2016, which application is incorporated herein by reference.

TECHNICAL FIELD

The present invention relates to an apparatus and method for detecting an oil spill by using a satellite image, and more particularly to an apparatus and method for detecting an oil spill by using a satellite image, which are capable of improving the reliability of a satellite image of a predicted oil spill area by correcting the satellite image of the predicted oil spill area, and which are also capable of considerably improving accuracy and reliability in the determination of the range of the oil spill area by converting the corrected satellite image into color channel images, generating direction vectors for changes in respective RGB color channels at an arbitrary point of each of the oil spill area and a seawater area in the color channel images, and then analyzing the direction vectors.

BACKGROUND ART

An oil spill on the surface of the sea resulting from the crash of oil tankers, the explosion of a marine well, or the like is one of the major marine disasters that have serious impacts on marine ecosystems. Therefore, it is very important to monitor the location and spreading process of spilled oil over a wide area in order to minimize ecological and economic damage resulting from an oil spill.

In connection with a method of locating oil spilled on the surface of the sea, a satellite image refers to a photo or image that is captured through the remote monitoring of a satellite. Such a satellite image is data that includes information on the surface of the earth over a wide area based on the capture angle of the satellite and that can be used to periodically generate the information of the same area based on the capture cycle of the satellite. Such a satellite image is data that can be usefully utilized for the monitoring of an oil spill requiring wide-range and time-series information, and research into technology for the utilization of a satellite image is actively conducted in research institutes around the world.

In particular, an optical satellite image that is generated by imaging solar radiation energy reflected from the surface of the earth is widely used to classify visually distinguishable objects because it has a great effect on the representation of visual information. Such optical images have different applications depending on the spatial resolution and radiometric resolution of a pixel, and can be classified into a low-resolution image, an intermediate-resolution image, and a high-resolution image.

An image with 500 m or higher spatial resolution can be classified as a low-resolution satellite image. Although such a low-resolution satellite image is disadvantageous in that it cannot provide complicated geographical information in detail, it exhibits high spectral resolution, and thus provides channel images in about 20 and more wavelength bands. In addition, a representative area where such a low-resolution optical image can be desirably utilized is the ocean, and most of the ocean area is composed of seawater. Accordingly, the ocean requires information in various wavelength bands rather than high spatial resolution, and thus information, such as the flow of seawater, the location of the occurrence of planktons, a blue tide or a red tide, the spread of oil, or the like, can be generated based on an acquired low-resolution optical image.

However, when an oil spill is dealt with, a low-resolution satellite image has a limitation on providing detailed information, such as the location of a rescue target vessel, the spread of an oil spill, the location of emulsified oil, or the degree of weathering, due to its low resolution.

Meanwhile, among optical images, a high-resolution satellite image with 4 m or lower spatial resolution exhibits low spectral resolution, and mostly provides only channel images in the visible and near infrared wavelength bands. However, a high-resolution satellite image has high spatial resolution, and is thus excellent for representing the detailed information of geographical features in a manner similar to the manner in which a human sees them. Therefore, such high-resolution satellite images have been mainly used for the production of images of land, and have been used for mapping, vegetation detection, object classification, and resource exploration.

In recent years, as high-resolution wide area information has been required when an oil spill accident occurs in the ocean, high-resolution satellite images have been actively used to instruct rescue persons to conduct disaster prevention activities for a ship, to provide information about the installation of oil fences, to determine the progress of the emulsification and weathering of oil, and so force. Related technologies were proposed in Korean Patent No. 10-1039665 entitled "Oil Spill Detection Method using Visible-band Satellite Data," Korean Patent No. 10-1400924 entitled "Oil Spill Monitoring Method for Increasing Reliability of Monitoring of Oil Spill by Using Remote Sensing Data," and Korean Patent No. 10-1534620 entitled "Method and Apparatus for Detecting Spilled Oil in Ocean."

The above-described prior art "Oil Spill Detection Method using Visible-band Satellite Data" is a technology for detecting oil by comparing the amount of light of seawater and the amount of light of oil with each other. More specifically, this prior art is directed to a method of detecting oil by using the fact that the reflectance of sea water and the reflectance of oil differ from each other in the wavelength band of 550 to 600 nm. However, when the solar radiation energy reflected from seawater and the solar radiation energy reflected from oil reach a satellite sensor, they are influenced by the atmosphere, and thus the information of the seawater and the information of the oil actually recorded may vary. Therefore, there is a need for a technology for detecting spilled oil based on an image.

In addition, in the case of a high resolution optical image, the roughness of the surface of seawater is changed by waves, and thus solar radiation energy recorded in the sensor is changed. The above-described prior art "Oil Spill Detection Method using Visible-band Satellite Data" has a limitation on detecting an oil spill by using an actual satellite image because the prior art does not take into account the above-described influence.

Meanwhile, the above-described prior art "Oil Spill Monitoring Method for Increasing Reliability of Monitoring of Oil Spill by Using Remote Sensing Data" and the above-described prior art "Method and Apparatus for Detecting Spilled Oil in Ocean" use satellite radar images other than high-resolution optical images. Accordingly, they have a limitation on extracting visual information because the satellite radar images use electromagnetic waves.

Therefore, there is a need for technology that is capable of increasing the reliability of a satellite image by minimizing the influences of the atmosphere and waves in the detection of an oil spill in the ocean using a satellite image and that is also capable of improving accuracy and efficiency in the extraction of visual information.

SUMMARY OF THE DISCLOSURE

An object of the present invention is to provide an apparatus and method for detecting an oil spill by using a satellite image, which are capable of generating a highly reliable satellite image by minimizing the influences of the atmosphere and waves in the detection of an oil spill in the ocean using a satellite image and which are also capable of more accurately determining the range of the oil spill area by improving accuracy and efficiency in the extraction of visual information.

In order to achieve the above object, according to an aspect of the present invention, there is provided an apparatus for detecting an oil spill by using a satellite image, the apparatus including: a satellite image reception unit configured to receive a satellite image of a predicted oil spill area in the ocean; a satellite image correction unit configured to correct the satellite image by compensating for the influences of the atmosphere and waves in the predicted oil spill area; a spectral angle mapper image generation unit configured to convert the corrected satellite image into a color channel image, and to generate a spectral angle mapper image representative of a spectral angle distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; a spectral vector distance image generation unit configured to convert the corrected satellite image into a color channel image, and to generate a spectral vector distance image representative of a spectral vector distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; and an oil spill area detection unit configured to derive the range of the oil spill area by combining the information of the spectral angle mapper image and the information of the spectral vector distance image with each other.

The satellite image reception unit may be a satellite image reception unit configured to receive a 4 m or lower resolution optical image.

The satellite image correction unit may include an atmospheric influence compensation unit configured to compensate for the influence of the atmosphere in the satellite image by using an atmospheric correction technique or image-based correction technique.

The satellite image correction unit may include a wave influence compensation unit configured to compensate for the influence of the waves in the satellite image by using a directional filter in which a lateral window of the satellite image is larger than a vertical window thereof or a vertical window of the satellite image is larger than a lateral window thereof.

The directional filter may be a median value filter configured to replace the wavelength value of one arbitrary point of the satellite image with the median value of a window centered on the point and to represent the median value.

Each of the spectral angle mapper image generation unit and the spectral vector distance image generation unit may calculate the average values of the reflectance values of the visible and near-infrared channel images in at least two pixels of the oil spill area in the color channel image, and may generate a first direction vector for changes in the average values.

The apparatus may further include an oil spill area selection unit configured to receive an arbitrary range of the oil spill area in the corrected satellite image.

In order to achieve the above object, according to another aspect of the present invention, there is provided a method of detecting an oil spill by using a satellite image, the method including: a satellite image reception step of receiving a satellite image of a predicted oil spill area in the ocean; a satellite image correction step of correcting the satellite image by compensating for the influences of the atmosphere and waves in the predicted oil spill area; a spectral angle mapper image generation step of converting the corrected satellite image into a color channel image, and generating a spectral angle mapper image representative of a spectral angle distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; a spectral vector distance image generation step of converting the corrected satellite image into a color channel image, and generating a spectral vector distance image representative of a spectral vector distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; and an oil spill area detection step of deriving the range of the oil spill area by combining the information of the spectral angle mapper image and the information of the spectral vector distance image with each other.

In order to achieve the above object, according to still another aspect of the present invention, there is provided a computer-readable storage medium having stored thereon a program for executing the method of detecting an oil spill by using a satellite image.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Preferred embodiments of the present invention will be described in detail with reference to the accompanying drawings. In the following description of the present invention, when it is determined that a detailed description of a related well-known configuration or function may make the gist of the present invention obscure, the detailed description will be omitted. Furthermore, in the following description of the embodiments of the present invention, specific numerical values are merely examples.

Figure 1:
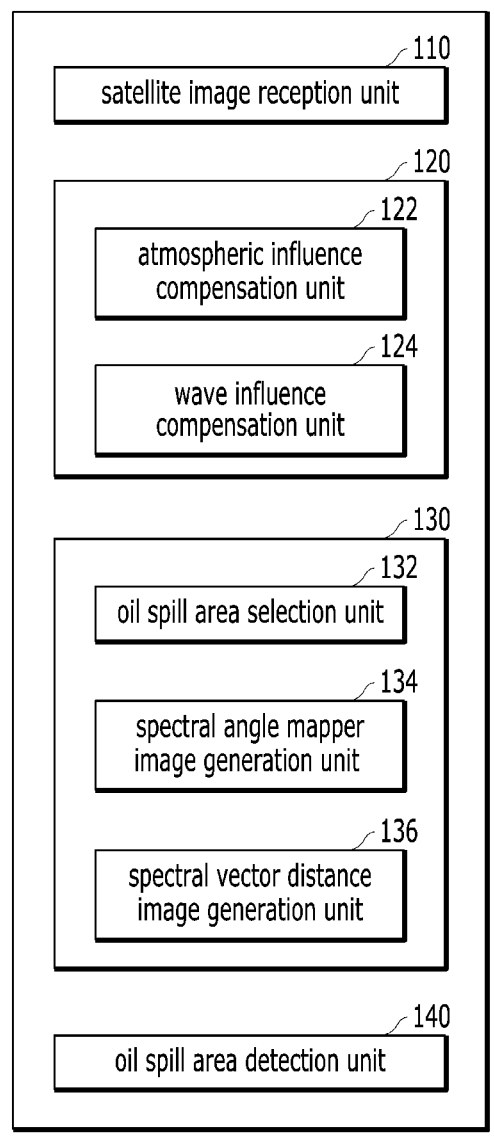
FIG. 1 is a schematic diagram schematically showing the configuration of an apparatus for detecting an oil spill by using a satellite image according to an embodiment of the present invention.

FIG. 1 is a schematic diagram schematically showing the configuration of an apparatus for detecting an oil spill by using a satellite image according to an embodiment of the present invention.

Referring to FIG. 1, the apparatus for detecting an oil spill by using a satellite image according to the present embodiment includes: a satellite image reception unit 110 configured to receive a satellite image of a predicted oil spill area in the ocean; a satellite image correction unit 120 configured to correct the satellite image by compensating for the influences of the atmosphere and waves in the predicted oil spill area; a spectral angle mapper image generation unit 134 configured to convert the corrected satellite image into a color channel image, and to generate a spectral angle mapper image representative of a spectral angle distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; a spectral vector distance image generation unit 136 configured to convert the corrected satellite image into a color channel image, and to generate a spectral vector distance image representative of a spectral vector distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; and an oil spill area detection unit 140 configured to derive the range of the oil spill area by combining the information of the spectral angle mapper image and the information of the spectral vector distance image with each other.

In other words, the apparatus for detecting an oil spill by using a satellite image according to the present embodiment receives a satellite image of a predicted oil spill area in the ocean, corrects the satellite image by compensating for the influences of the atmosphere and waves, generates direction vector values for the reflectance values of visible and near-infrared channel images in at least one arbitrary pixel in the oil spill area and at least one arbitrary pixel in an area other than the oil spill area in the color channel images of the corrected satellite image, calculates spectral angle and vector distances between the direction vector values, generates a spectral angle mapper image and a spectral vector distance image, and finally derives the range of the oil spill area by combining the pieces of information of the images with each other in order to increase accuracy in the extraction of the visual information of the oil spill area.

Therefore, the apparatus for detecting an oil spill by using a satellite image according to the present embodiment can generate and use a highly reliable satellite image by minimizing the influences of the atmosphere and waves in the detection of an oil spill in the ocean by using a satellite image, and can more accurately determine the range of the oil spill area by improving accuracy and efficiency in the determination of the oil spill area.

The satellite image reception unit 110 may be implemented as a satellite image reception unit configured to receive a 4 m or lower resolution optical image. In other words, the satellite image reception unit 110 may be implemented as a satellite image reception unit configured to receive a 4 m or lower resolution optical image with high resolution, and thus an satellite image containing the more detailed progress of emulsification and weathering of oil in the sea where oil has been spilled can be received, thereby further improving accuracy in the determination of the oil spill area.

As long as the satellite image correction unit 120 is configured to correct the satellite image by compensating for the influences of the atmosphere and waves in the predicted oil spill area, the detailed structure or configuration thereof is not specially limited. For example, the satellite image correction unit 120 may be configured to include: an atmospheric influence compensation unit 122 configured to compensate for the influence of the atmosphere in the satellite image by using an atmospheric correction technique or image-based correction technique; and a wave influence compensation unit 124 configured to compensate for the influence of the waves in the satellite image by using a directional filter in which the lateral window of the satellite image is larger than the vertical window thereof or the vertical window of the satellite image is larger than the lateral window thereof.

In this case, the directional filter may be implemented as a median value filter configured to replace the wavelength value of one arbitrary point of the satellite image with the median value of a window centered on the point and to represent the median value.

The spectral angle mapper image generation unit 134 and the spectral vector distance image generation unit 136 may be integrated with an oil spill area selection unit 132 configured to receive an arbitrary range of the oil spill area in the corrected satellite image into a satellite image editing unit 130.

In other words, a user of the apparatus for detecting an oil spill by using a satellite image may directly view and determine the corrected satellite image, and may input an arbitrary range of the oil spill area to the apparatus for detecting an oil spill via the oil spill area selection unit 132. The spectral angle mapper image generation unit 134 and the spectral vector distance image generation unit 136 may select at least one arbitrary pixel from the oil spill area input by the user, and may generate a first direction vector for changes in the reflectance values of the visible and near-infrared channel images.

In this case, each of the spectral angle mapper image generation unit 134 and the spectral vector distance image generation unit 136 may calculate the average values of the reflectance values of the visible and near-infrared channel images in at least two pixels of the oil spill area in the color channel image, and may generate a first direction vector for changes in the average values.

Figure 2:
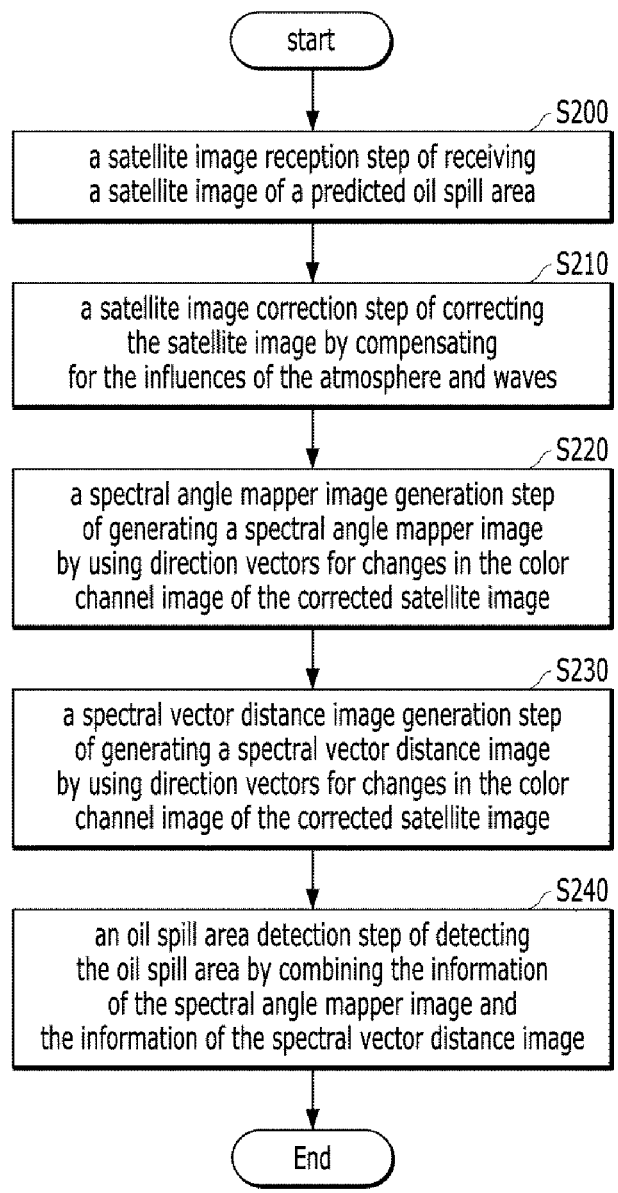
FIG. 2 is a block diagram showing the sequence of a method of detecting an oil spill by using a satellite image according to an embodiment of the present invention.

FIG. 2 is a block diagram showing the sequence of a method of detecting an oil spill by using a satellite image according to an embodiment of the present invention.

Referring to FIG. 2, the method of detecting an oil spill by using a satellite image according to the present embodiment includes: satellite image reception step S200 of receiving a satellite image of a predicted oil spill area in the ocean; satellite image correction step S210 of correcting the satellite image by compensating for the influences of the atmosphere and waves in the predicted oil spill area; spectral angle mapper image generation step S220 of converting the corrected satellite image into a color channel image, and generating a spectral angle mapper image representative of a spectral angle distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; spectral vector distance image generation step S230 of converting the corrected satellite image into a color channel image, and generating a spectral vector distance image representative of a spectral vector distance between a first direction vector for the reflectance values of visible and near-infrared channel images in at least one arbitrary pixel of the oil spill area in the color channel image and a second direction vector for the reflectance values of visible and near-infrared channel images in at least one arbitrary pixel in an area other than the oil spill area; and oil spill area detection step S240 of deriving the range of the oil spill area by combining the information of the spectral angle mapper image and the information of the spectral vector distance image with each other.

In other words, the method of detecting an oil spill by using a satellite image according to the present embodiment is performed by performing the process of receiving a satellite image of a predicted oil spill area in the ocean, correcting the satellite image by compensating for the influences of the atmosphere and waves, generating direction vector values for the reflectance values of visible and near-infrared channel images in at least one arbitrary pixel in the oil spill area and at least one arbitrary pixel in an area other than the oil spill area in the color channel images of the corrected satellite image, calculating spectral angle and vector distances between the direction vector values, generating a spectral angle mapper image and a spectral vector distance image, and finally deriving the range of the oil spill area by combining the pieces of information of the images in order to increase the accuracy of the extraction of the visual information of the oil spill area with each other.

Therefore, the method of detecting an oil spill by using a satellite image according to the present embodiment can generate and use a highly reliable satellite image by minimizing the influences of the atmosphere and waves in the detection of an oil spill in the ocean by using a satellite image, and can more accurately determine the range of an oil spill area by improving accuracy and efficiency in the determination of an oil spill area.

Figure 3:
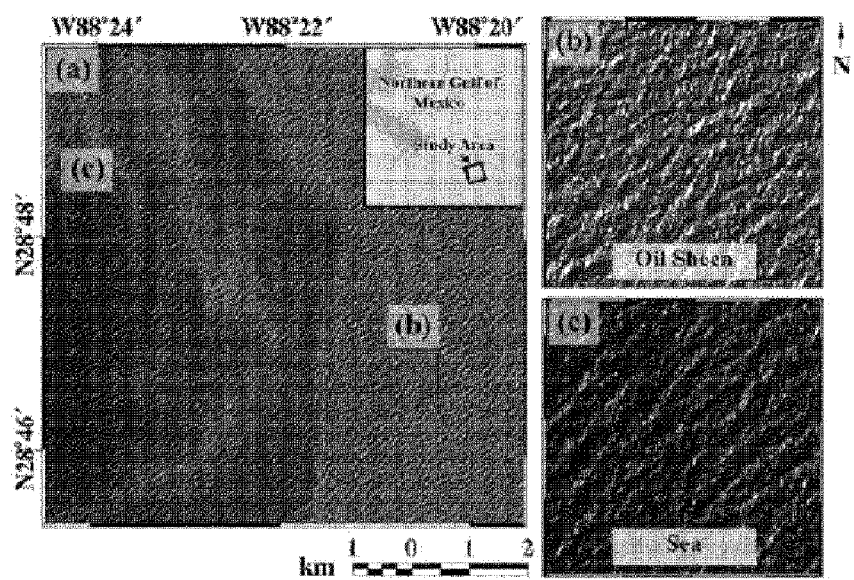
FIG. 3 shows satellite image photos showing an example of a satellite image received via the apparatus for detecting an oil spill by using a satellite image according to the embodiment of the present invention.
Figure 4:
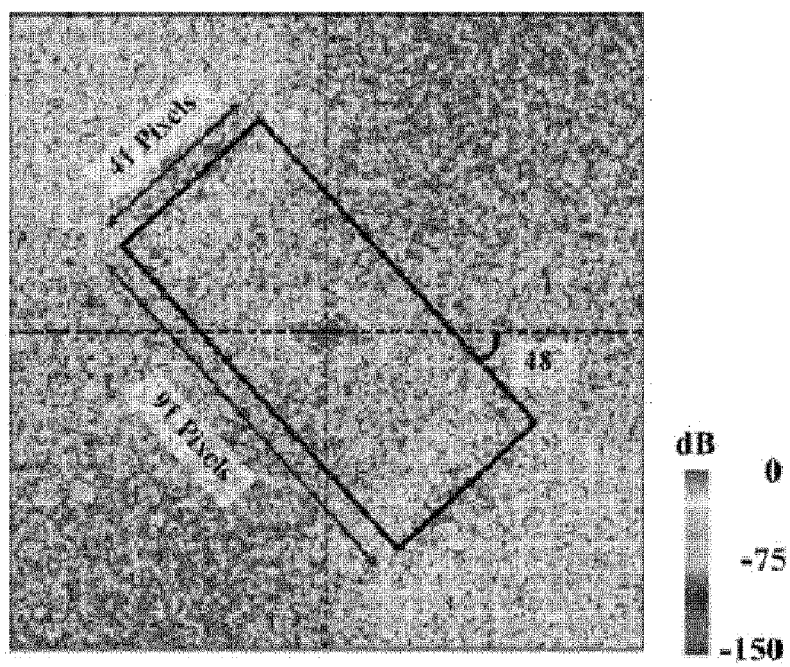
FIG. 4 is a photo showing an example of a frequency image generated to compensate for the influence of waves in the satellite image received via the apparatus for detecting an oil spill by using a satellite image according to the embodiment of the present invention.
Figure 5:
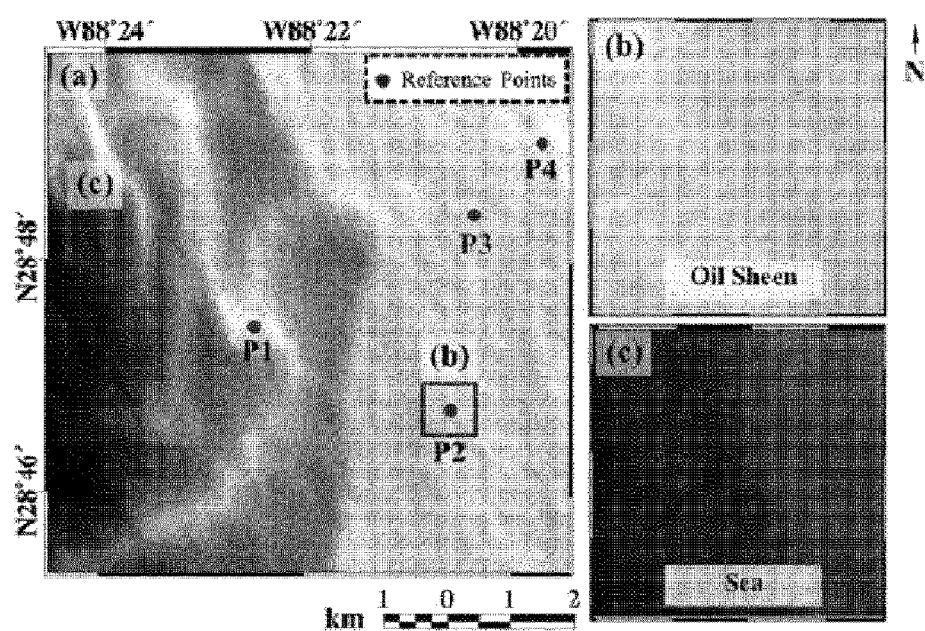
FIG. 5 shows photos showing an example of a satellite image in which the influences of the atmosphere and waves have been compensated for by the apparatus for detecting an oil spill by using a satellite image according to the embodiment of the present invention.

FIG. 3 shows satellite image photos showing an example of a satellite image received via the apparatus for detecting an oil spill by using a satellite image according to the embodiment of the present invention; FIG. 4 is a photo showing an example of a frequency image generated to compensate for the influence of waves in the satellite image received via the apparatus for detecting an oil spill by using a satellite image according to the embodiment of the present invention; and FIG. 5 shows photos showing an example of a satellite image in which the influences of the atmosphere and waves have been compensated for by the apparatus for detecting an oil spill by using a satellite image according to the embodiment of the present invention.

Figure 6:
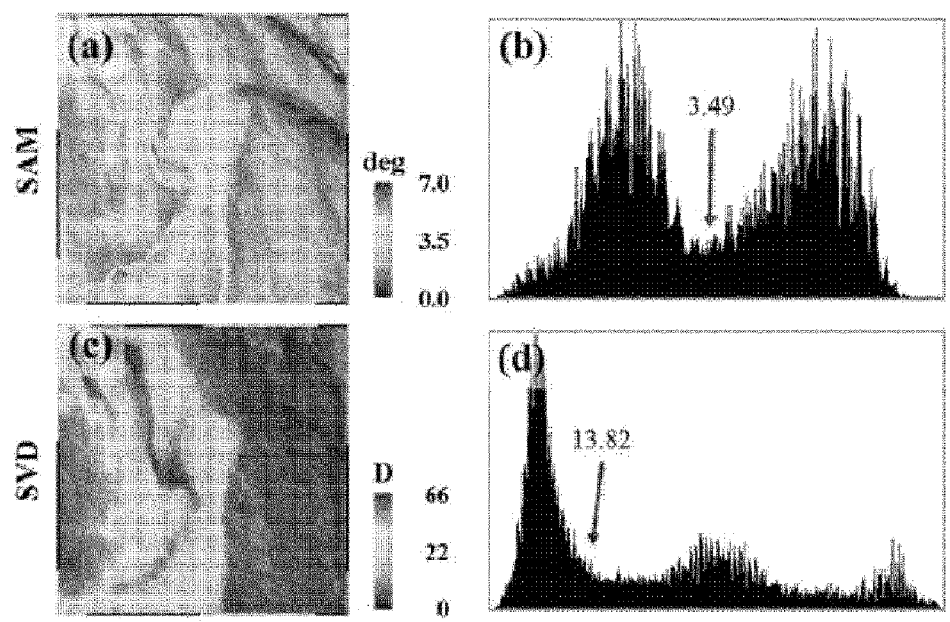
FIG. 6 shows photos showing examples of the spectral angle mapper image and spectral vector distance image of a satellite image generated by the apparatus for detecting an oil spill by using a satellite image according to the embodiment of the present invention.
Figure 7:
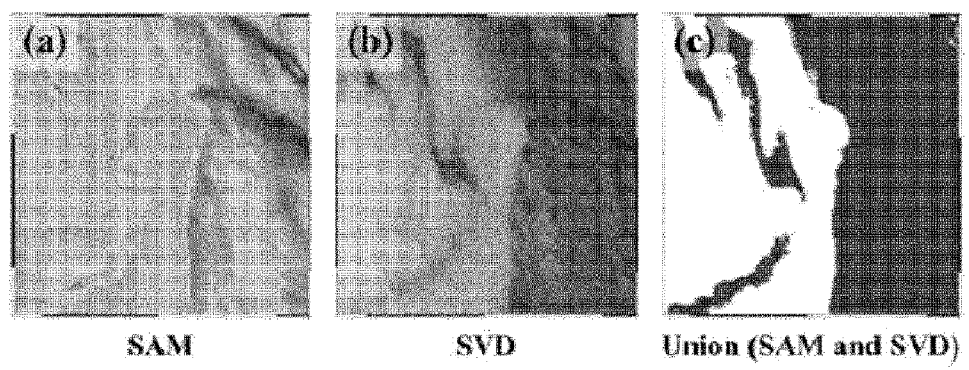
FIG. 7 shows photos showing examples of images obtained by applying boundary values to the spectral angle mapper image and spectral vector distance image of the satellite image generated by the apparatus for detecting an oil spill by using a satellite image according to the embodiment of the present invention and an example of an image obtained by combining the above images.
Figure 8:
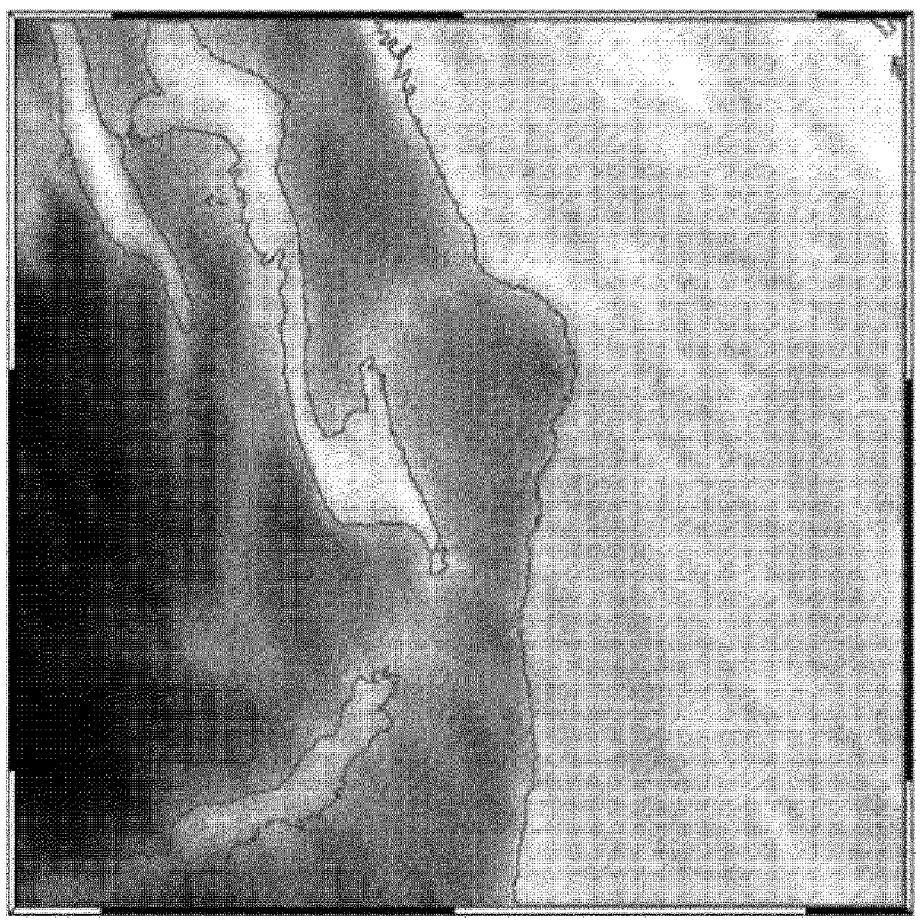
FIG. 8 is a photo showing an example of a result image with a spilled oil detected, which is generated by the apparatus for detecting an oil spill by using a satellite image according to the embodiment of the present invention.

FIG. 6 shows photos showing examples of the spectral angle mapper image and spectral vector distance image of a satellite image generated by the apparatus for detecting an oil spill by using a satellite image according to the embodiment of the present invention; FIG. 7 shows photos showing examples of images obtained by applying boundary values to the spectral angle mapper image and spectral vector distance image of the satellite image generated by the apparatus for detecting an oil spill by using a satellite image according to the embodiment of the present invention and an example of an image obtained by combining the above images; and FIG. 8 is a photo showing an example of a result image with a spilled oil detected, which is generated by the apparatus for detecting an oil spill by using a satellite image according to the embodiment of the present invention.

The apparatus and method for detecting an oil spill by using a satellite image according to the present invention will be described in greater detail with reference to the above photos. The satellite image reception unit 110 is a component configured to acquire a high-resolution optical image with 4 m or lower resolution. In this case, the satellite image refers to an image recorded in an image sensor of an artificial satellite, and includes all channel images in the visible and near-infrared wavelength bands.

In the photos of the high-resolution optical satellite images of a predicted oil spill area received by the satellite image reception unit 110, which are shown in FIG. 3, FIG. 3(*a*) is a satellite image photographed by Korea Multipurpose Satellite-2 on May 2, 2010, and is an image of oil spilled in the Gulf of Mexico. In this image, spilled oil and a normal seawater surface can be roughly and visually distinguished from each other.

Furthermore, FIG. 3(*b*) and FIG. 3(*c*) are enlarged photos of areas corresponding to the spilled oil and the normal seawater surface in FIG. 3(*a*), from which it can be seen that the spilled oil tends to be visually brighter than the normal seawater surface. Furthermore, both the areas include the influence of waves. Depending on the influence of the waves, some areas are very bright, and some areas are very dark. Accordingly, it can be seen that the possibility of the false detection of the oil spill area is significantly strong when the oil spill is detected without compensating the influence of the waves.

The satellite image correction unit 120 including the atmospheric influence compensation unit 122 and the wave influence compensation unit 124 compensates for the influences of the atmosphere and waves appearing in a satellite image.

More specifically, in connection with the satellite image correction of the atmospheric influence compensation unit 122, solar radiation energy reflected from seawater and oil reaches a satellite sensor through the atmosphere. In this case, as the solar radiation energy passes through the atmosphere, it is influenced by the scattering, absorption and refraction of the atmosphere. Accordingly, when an oil spill is detected using a satellite image, there is required a process of compensating for the influence of the atmosphere. The techniques for compensating for the influence of the atmosphere may be basically classified into an atmospheric correction technique based on an atmospheric model and an image-based correction technique. The atmospheric correction technique based on an atmospheric model is a method of obtaining transmissivity, atmospheric upward radiation, and atmospheric downward radiation via an atmospheric model, such as MODTRAN, 6S, or the like, and then performing correction. The image-based correction technique is a method of assuming that an object approximate to a black body is present in an image and estimating an atmospheric effect from the assumption.

In connection with the satellite image correction of the wave influence compensation unit 124, the high-resolution optical satellite image contains waves generated due to weather and the flows of wind and an ocean current on a photographing date, as can be seen from FIG. 3. The waves generated as described above are a main cause to increase false detection rate when detecting an oil spill by using a high-resolution optical image. Due to the influence of the waves, some areas are bright, and some areas are dark. To effectively remove the influence of the waves, the wave influence compensation unit 124 compensates for the influence of the waves by applying a filter to the optical satellite image.

In other words, the directional filter directional filter included and used in the wave influence compensation unit 124 may be a median value filter having a window in which a size in a lateral or vertical direction is larger. In this case, the median value filter is a low-pass filter configured to replace a value, such as a wavelength value, a reflectance value, or the like, at any point of an image with a median value within a window centered on the point. Accordingly, when the median value filter is applied, low-frequency portions having a small value difference with respect to surrounding areas within the image are passed through the filter and boundary and contour portions having high frequencies are blocked in the portion of the image to which the filter has been applied, and thus the effect of smoothing the image is achieved. For example, when a median value filter having a window in a vertical size is larger than a lateral size is applied, there is achieved an effect in that little smoothing is performed in a vertical direction and more smoothing is performed in a later direction than in the vertical direction.

More specifically, in connection with the application of the directional filter to waves, the crest portions of rolling waves are bright and the trough portions of the waves are dark in an image, and thus the directional filter needs to be applied according to the rolling pattern of waves. Furthermore, the influence of waves within an image can be compensated for only when a directional filter in which the size of a filter window is smaller in a direction parallel to two adjacent crests and the size of the filter window is larger in a direction vertical to the adjacent crests is applied. To more effectively reduce the influence of waves within an image, it is important to determine the appropriate sizes of a filter window in the lateral and vertical directions of the directional filter and an angle, which may be determined through image analysis in the frequency domain.

The image analysis in the frequency domain is achieved by performing the 2D fast Fourier transform on an image including a wave effect in lateral and vertical directions. Via the Fourier transform, a space domain-type image may be converted into frequency domain-type basic frequencies. The image converted into the frequency domain type may be represented in a complex value form. A power spectrum image may be generated by multiplying the image by a complex conjugate image. An image in which the unit of the power spectrum image has been converted into a decibel unit, i.e., a log scale unit, is shown in FIG. 4.

FIG. 4 is a power spectrum image in the frequency domain that is generated from an image in which the influence of the atmosphere appearing in a high-resolution satellite image has been compensated for by the atmospheric influence compensation unit 122. In this case, the influence of waves is dominant over the overall image, and can be also observed in the power spectrum image. The pattern of the waves was rotated clockwise at an angle of about 48°, and about 91 pixels were observed between two adjacent crests and about 41 pixels were observed in a direction parallel to the wave crests.

Accordingly, once the size and angle of the directional filter have been determined, the sizes of a filter including the overall directional filter into which rotation has been incorporated in vertical and later directions can be determined. The directional filter into which rotation has been incorporated is configured such that among the pixels within the filter, the pixels included in the rotated directional filter are allocated 1 and the pixels not included therein are allocated 0. This configuration is intended to enable the directional filter to take only image values corresponding to 1 parts of the rotated directional filter while moving across the image, to calculate a median value, and to smooth the image. In the case where a wave effect pattern within an image has a predetermined angle, when directional filtering is performed while taking into rotation, the pattern of waves within the image can be more effectively extracted.

When FIG. 5(a) of FIG. 5 showing a satellite image in which the influence of waves has been compensated for is compared with FIG. 3(a), it can be visually seen that the influence of waves has been compensated for, from which it can be seen that an oil spill area can be visually distinguished more clearly. FIGS. 5(b) and 5(c) are enlarged photos of an oil spill area and a normal seawater area, respectively, from which it can be seen that the influence of waves has been almost compensated for.

The satellite image editing unit 130 calculates the distances between the oil spill area and the normal seawater area by using the satellite image in which the influences of the atmosphere and the waves have been compensated for by the satellite image correction unit 120.

More specifically, the satellite image editing unit 130 acquires information about individual channel images of oil spill areas, selected by a user, via the oil spill area selection unit 132, and calculates a spectral angle distance between channel information values and a spectral vector distance from the information.

The oil spill areas selected by the user via the oil spill area selection unit 132 may be indicated by P1, P2, P3, and P4, as shown in FIG. 5. The following Table 1 shows an example of the information values of the respective channel images of the oil spill areas selected by the user, which appear in the corrected optical satellite image.

TABLE 1

|  | P1 | P2 | P3 | P4 | Mean |
|---|---|---|---|---|---|
| Blue Channel | 87.11 | 85.02 | 84.27 | 87.06 | 85.87 |
| Green Channel | 77.63 | 84.25 | 77.82 | 81.44 | 80.29 |
| Red Channel | 77.48 | 79.35 | 83.31 | 89.33 | 82.37 |
| NIR Channel | 49.12 | 46.52 | 51.29 | 54.20 | 50.28 |

The average values of the image info nation values of the oil spill areas shown in Table 1 can be utilized as the representative values of the spilled oil spill areas.

In other words, although the oil spill areas selected by the user have different values for the respective channel images, the average values can be utilized as the representative values capable of describing the characteristics of the oil spill areas that appear in the high-resolution optical satellite image photographed on the corresponding date.

In connection with the meanings of the information values of the oil spill areas, the physical meanings thereof are now described. The sun emits radiation energy ranging from a very high-frequency gamma wave with a very short wavelength to a radio wave with a very long wavelength. In the radiation energy, the visible wavelength band ranges from about 400 to 700 nm and the near infrared wavelength band ranges from about 700 to 1200 nm. In addition, this solar radiation energy goes through a process of, after being emitted from the sun, reaching the atmosphere and the surface of the earth, undergoing various interactions, and then being reflected back to space.

Meanwhile, the sensor mounted in the artificial satellite can image solar radiation energy reflected from the ground surface of the earth by recording it. The sensor may digitize only energy in a specific wavelength band by recording it. In this case, the unit of the digitized value (at-sensor radiance) recorded in the sensor is the amount of incident radiation energy per unit area, i.e., $W_m^{-1}$. In other words, the value once recorded in the satellite image is at-sensor radiance.

However, most satellite sensors have a limitation on storing radiance values. For example, 8-bit sensors can represent only values ranging from 0 to 255. Therefore, the radiant energy value recorded in the sensor is converted into a value in the range of 0 to 255, and is then provided along with a separate conversion equation.

In other words, in the case of a satellite sensor with 8-bit resolution, the digitized value recorded in the sensor is an at-sensor radiance value, but a value converted and identified by a user ranges from 0 to 255. This converted at-sensor radiance value is referred to as a digital number (DN) value.

Meanwhile, the reflectance may be explained based on the ratio of the solar radiation reaching the ground surface of the earth to the reflected and emitted solar radiation. For example, when energy of 100 reaches the ground surface of the earth and then energy of 40 is emitted, the reflectance of the ground surface may be expressed as 0.4. Since the reflectance of each ground surface differs from surface to surface, it is generally effective to use the reflectance rather than a DN value or at-sensor radiance in order to distinguish the ground surface. The reflectance of each ground surface may be estimated after compensating for the influence of the atmosphere in at-sensor radiance (atmospheric correction).

Accordingly, although an at-sensor radiance value or DN value may be used to distinguish a ground surface via an image, a reflectance value is preferably used to more clearly distinguish the ground surface.

The image information values of the oil spill areas listed in Table 1 are the reflectance values of the oil spill areas generated by acquiring individual channel images (blue, green, red, and near-infrared images) and then performing atmosphere correction.

Meanwhile, all the pixels in the channel images have the reflectance values of blue, green, red and near-infrared channel images. When the image has a dimension of 500× 500, the number of pixels is 250,000. Accordingly, for example, when the values of blue, green, red, near-infrared channel images are 87.11, 77.63, 77.48, and 49.12, respectively, in at least one arbitrary pixel of the oil spill area, they are expressed as a vector (87.11, 77.63, 77.48, 49.12). The first direction vector and the second direction vector may be generated using the vector.

The average values listed in Table 1 may vary depending on the date or area on or in which the high-resolution optical satellite image is photographed, or the results obtained by compensating for the influences of the atmosphere and waves. Accordingly, a user needs to take into account the fact that the average values may be different from the reflectance values of the seawater of the actual oil spill area.

The spectral angle mapper image generation unit 134 generates a spectral angle mapper image representative of the spectral angle distance to the pixel within the image by using the per-channel information values of the oil spill areas the selected by the oil spill area selection unit 132.

In this case, the per-channel spectral angle distance refers to the spectral angle distance between a direction vector formed by the per-channel information values of the oil spill areas and a direction vector formed by the per-channel information values of the seawater area within the image. In this case, the spectral angle distance between the direction vectors may be calculated by Equation 1 below:

$$\alpha_{(i,j)} = \cos^{-1}\left(\frac{\overrightarrow{a_{ref}} \cdot \overrightarrow{b_{(i,j)}}}{\|\overrightarrow{a_{ref}}\| \cdot \|\overrightarrow{b_{(i,j)}}\|}\right) \quad (1)$$

In Equation 1, $\alpha_{(i,j)}$ is the spectral angle distance between the direction vector of oil and the direction vector of the pixel within the image, and i and j are an image coordinate in a pixel direction and an image coordinate in a line direction, respectively. Furthermore, $\overrightarrow{a_{ref}}$ is the direction vector for the per-channel information of the oil spill areas selected by a user, $\overrightarrow{b_{(i,j)}}$ is the direction vector for per-channel information corresponding to the image coordinates, and $\overrightarrow{a_{ref}}$ and $\overrightarrow{b_{(i,j)}}$ are the size of the direction vector of the oil spill areas selected by the user and the size of the direction vector corresponding to the image coordinates, respectively.

The spectral vector distance image generation unit 136 generates an image representative of a spectral vector distance to the pixel within the image by using the per-channel information values of the oil acquired by the oil spill area selection unit 132.

In this case, the per-channel spectral vector distance refers to the spectral vector distance between the direction vector formed by the per-channel information values of the oil spill areas and the direction vector formed by the per-channel information values of the seawater area within the image. In this case, the spectral vector distance between the direction vectors may be calculated by Equation 2 below:

$$D_{(i,j)} = \sqrt{\left(\overrightarrow{a_{ref,1}} - \overrightarrow{b_{(i,j),1}}\right)^2 + \left(\overrightarrow{a_{ref,2}} - \overrightarrow{b_{(i,j),2}}\right)^2 + \ldots + \left(\overrightarrow{a_{ref,n}} - \overrightarrow{b_{(i,j),n}}\right)^2} \quad (2)$$

In Equation 2, $D_{(i,j)}$ is the spectral vector distance between the direction vector of the oil and the direction vector of the pixel within the image, $\overrightarrow{a_{ref,n}}$ is the information value of the n-th channel of the direction vector of the oil, and $\overrightarrow{b_{(i,j),n}}$ is the information value of the n-th channel of the direction vector of the pixel within the image.

Photos of the spectral angle mapper image and the spectral vector distance image generated via the spectral angle mapper image generation unit 134 and the spectral vector distance image generation unit 136 are shown in FIG. 6. In this case, FIG. 6(a) is an image showing a spectral angle distance between the oil spill areas selected by a user and the seawater area. In this image, the shorter the spectral angle distance is, the more likely an area is to be an oil spill area, and the longer the spectral angle distance is, the more likely an area is to be an area different from an oil spill area. In other words, in FIG. 6(a), the shorter the spectral angle distance is, the stronger the probability of being an oil spill area is, and the longer the spectral angle distance is, the stronger the probability of being a seawater area is. FIG. 6(b) is a histogram of the individual pixels of FIG. 6(a). From this histogram, it can be seen that the oil spill area and the seawater area can be visually distinguished from each other desirably. In this case, a boundary value that can desirably classify the two groups is 3.49.

FIG. 6(c) is an image showing the spectral vector distances to an oil spill area selected by the user. In this image, the shorter the spectral vector distance is, the more likely an area is to be an oil spill area, and the longer the spectral vector distance is, the more likely an area is to be an area different from an oil spill area. In other words, in FIG. 6(c), the shorter the spectral vector distance is, the stronger the probability of being an oil spill area is, and the longer the spectral vector distance is, the stronger the probability of being a seawater area is. FIG. 6(d) is a histogram of the individual pixels of FIG. 6(c). From this histogram, it can be seen that the oil spill area and the seawater area can be visually distinguished from each other desirably. In this case, a boundary value that can desirably distinguish the oil spill is 13.82.

The oil spill area detection unit 140 detects the oil spill area by using the spectral angle mapper image and the spectral vector distance image generated by the satellite image editing unit 130.

In other words, the oil spill area detection unit 140 detects the final oil spill area by identifying areas having the high probability of being an oil spill area in the images through the application of the boundary values to the spectral angle mapper image and the spectral vector distance image generated by the satellite image editing unit 130 and then combining the areas with each other, thereby improving accuracy in the determination of the range of an oil spill area.

More specifically, the oil spill area detection unit 140 detects the oil spill area by combining the advantage of the spectral angle mapper image and the advantage of the spectral vector distance image. The oil spill area detection unit 140 detects an area having a spectral angle distance similar to the per-channel characteristics of the oil spill area from the spectral angle mapper image, detects an area having a short spectral vector distance to the per-channel information values of the oil spill area from the spectral vector distance image, and combines the two areas, thereby detecting an area having the high probability of being an oil spill area.

FIG. 7 shows the results obtained by applying the boundary values to the spectral angle mapper image and the spectral vector distance image and then combining detected areas with each other. In this case, FIG. 7(a) shows an example of an image exhibiting a spectral angle distance, in which only pixels having a value smaller than the boundary value of 3.49 calculated by the spectral angle mapper image generation unit 134 are represented. FIG. 7(b) shows an example of an image exhibiting a spectral vector distance, in which only pixels having a value smaller than the boundary value of 13.82 calculated by the spectral vector distance image generation unit 136 are represented. FIG. 7(c) is a photo showing an example of a detected oil spill area obtained by generating the union of the result of FIG. 7(a) and the result of FIG. 7(b).

FIG. 8 discloses a photo showing an example of a result image with a spilled oil detected, which is generated by the apparatus for detecting an oil spill by using a satellite image according to the embodiment of the present invention. In this case, the red lines illustrated in the drawing refer to the range of the oil spill area that is finally detected by the apparatus and method for detecting an oil spill according to the present invention.

Accordingly, the highly reliable and accurate detection of the oil spill area can be performed in the detection of the predicted oil spill area in the ocean by determining the area defined by the red lines, and an effective disaster prevention policy for a marine oil spill accident that causes environmental and economic damage can be formulated.

The method and apparatus for detecting an oil spill by using a satellite image according to the present invention may be implemented in the form of program instructions which can be executed by a variety of computer means, and may be stored in a computer-readable storage medium. The computer-readable storage medium may include program instructions, a data file, and a data structure solely or in combination. The program instructions which are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code which is constructed by a compiler but also high-level language code which can be executed by a computer using an interpreter or the like. The above-described hardware components may be configured to act as one or more software modules which perform the operation of the present invention, and vice versa.

The apparatus and method for detecting an oil spill by using a satellite image according to the present invention have the advantage of being capable of generating a highly reliable satellite image by minimizing the influences of the atmosphere and waves in the detection of an oil spill in the ocean using a satellite image and the advantage of being capable of more accurately determining the range of the oil spill area by improving accuracy and efficiency in the extraction of visual information.

While the present invention has been described in conjunction with specific details, such as specific components, and the limited embodiments and diagrams above, these are provided merely to help an overall understanding of the present invention. The present invention is not limited to these embodiments, and various modifications and alterations may be made based on the foregoing description by those having ordinary knowledge in the art to which the present invention pertains.

Therefore, the technical spirit of the present invention should not be determined based on only the described embodiments, and the following claims, all equivalents to the claims and equivalent modifications should be construed as falling within the scope of the spirit of the present invention.

What is claimed is:

1. An apparatus for detecting an oil spill by using a satellite image, the apparatus comprising:
   a satellite image reception unit configured to receive a satellite image of a predicted oil spill area in an ocean;
   a satellite image correction unit configured to correct the satellite image by compensating for influences of an atmosphere and waves in the predicted oil spill area;
   a spectral angle mapper image generation unit configured to convert the corrected satellite image into a color channel image, and to generate a spectral angle mapper image representative of a spectral angle distance between a first direction vector for reflectance values of visible and near-infrared channel images in at least one arbitrary pixel of the oil spill area in the color channel image and a second direction vector for reflectance values of visible and near-infrared channel images in at least one arbitrary pixel in an area other than the oil spill area;
   a spectral vector distance image generation unit configured to convert the corrected satellite image into a color channel image, and to generate a spectral vector distance image representative of a spectral vector distance between a first direction vector for reflectance values of visible and near-infrared channel images in at least one arbitrary pixel of the oil spill area in the color channel image and a second direction vector for reflectance values of visible and near-infrared channel images in at least one arbitrary pixel in an area other than the oil spill area; and
   an oil spill area detection unit configured to derive a range of the oil spill area by combining information of the spectral angle mapper image and information of the spectral vector distance image with each other.

2. The apparatus of claim 1, wherein the satellite image reception unit is a satellite image reception unit configured to receive a 4 m or lower resolution optical image.

3. The apparatus of claim 1, wherein the satellite image correction unit comprises an atmospheric influence compensation unit configured to compensate for the influence of the atmosphere in the satellite image by using an atmospheric correction technique or image-based correction technique.

4. The apparatus of claim 1, wherein the satellite image correction unit comprises a wave influence compensation unit configured to compensate for the influence of the waves in the satellite image by using a directional filter in which a lateral window of the satellite image is larger than a vertical window thereof or a vertical window of the satellite image is larger than a lateral window thereof.

5. The apparatus of claim 4, wherein the directional filter is a median value filter configured to replace a wavelength value of one arbitrary point of the satellite image with a median value of a window centered on the point and to represent the median value.

6. The apparatus of claim 1, wherein each of the spectral angle mapper image generation unit and the spectral vector distance image generation unit calculates average values of the reflectance values of the visible and near-infrared channel images in at least two pixels of the oil spill area in the color channel image, and generates a first direction vector for changes in the average values.

7. The apparatus of claim 1, further comprising an oil spill area selection unit configured to receive an arbitrary range of the oil spill area in the corrected satellite image.

8. A method of detecting an oil spill by using a satellite image, the method comprising:
   a satellite image reception step of receiving a satellite image of a predicted oil spill area in an ocean;
   a satellite image correction step of correcting the satellite image by compensating for influences of an atmosphere and waves in the predicted oil spill area;
   a spectral angle mapper image generation step of converting the corrected satellite image into a color channel image, and generating a spectral angle mapper image representative of a spectral angle distance between a first direction vector for reflectance values of visible and near-infrared channel images in at least one arbitrary pixel of the oil spill area in the color channel image and a second direction vector for reflectance values of visible and near-infrared channel images in at least one arbitrary pixel in an area other than the oil spill area;
   a spectral vector distance image generation step of converting the corrected satellite image into a color channel image, and generating a spectral vector distance image representative of a spectral vector distance between a first direction vector for reflectance values of visible and near-infrared channel images in at least one arbitrary pixel of the oil spill area in the color channel image and a second direction vector for reflectance values of visible and near-infrared channel images in at least one arbitrary pixel in an area other than the oil spill area; and
   an oil spill area detection step of deriving a range of the oil spill area by combining information of the spectral angle mapper image and information of the spectral vector distance image with each other.

9. A computer-readable storage medium having stored thereon a program for executing the method of claim 8.

* * * * *